United States Patent [19]
Baker et al.

[11] Patent Number: 5,428,730
[45] Date of Patent: Jun. 27, 1995

[54] MULTIMEDIA SYSTEM HAVING SOFTWARE MECHANISM PROVIDING STANDARDIZED INTERFACES AND CONTROLS FOR THE OPERATION OF MULTIMEDIA DEVICES

[75] Inventors: Randolph S. Baker, Atlanta, Ga.; Richard E. DuLaney, Lighthouse Point; Patricia A. Esack, Boca Raton, both of Fla.; Stephen R. Henson, Atlanta, Ga.; Scott R. Swix, Half Moon Bay, Calif.; George E. Wagener, Marietta; Frank D. Warinner, Woodstock, both of Ga.; Scott J. Broussard, Boca Raton, Fla.

[73] Assignee: International Business Machines Corporation, Armonk, N.Y.

[21] Appl. No.: 991,034

[22] Filed: Dec. 15, 1992

[51] Int. Cl.$^6$ .............................. G06F 15/00
[52] U.S. Cl. ................... 395/154; 395/161
[58] Field of Search ............ 395/154, 155, 157, 159, 395/161

[56] References Cited

U.S. PATENT DOCUMENTS

| | | | |
|---|---|---|---|
| 4,845,644 | 7/1989 | Anthias et al. | 395/157 |
| 4,866,638 | 9/1989 | Cosentino et al. | 395/155 |
| 4,901,221 | 2/1990 | Kodosky et al. | 395/159 |
| 4,914,568 | 4/1990 | Kodosky et al. | 395/275 |
| 5,040,131 | 8/1991 | Torres | 395/156 |
| 5,041,992 | 8/1991 | Cunningham et al. | 395/155 |
| 5,060,140 | 10/1991 | Brown et al. | 364/200 |
| 5,065,345 | 11/1991 | Knowles et al. | 395/154 |
| 5,109,515 | 4/1992 | Laggis et al. | 395/725 |
| 5,291,587 | 3/1994 | Kodosky et al. | 395/500 |
| 5,293,476 | 3/1994 | Wolber et al. | 395/159 |
| 5,309,556 | 5/1994 | Sismilich | 395/161 |
| 5,313,574 | 5/1994 | Beethe | 395/159 |
| 5,333,299 | 7/1994 | Koval et al. | 395/550 |

OTHER PUBLICATIONS

Cohen, "LabVIEW Controls DOS, Tape Systems", MacWEEK, v. 6, No. 42, Nov. 23, 1992, p. 12 (1).

Rizzo, "LabVIEW 2", MacUSER, v. 7, No. 5, May 1991, p. 58 (2).

Santori, "An Instrument That Isn't Really", IEEE Spectrum, v. 27, No. 8, Aug. 1990, pp. 36–39.

Schmalzel, et al., "Instrumentation Curriculum: From ATE to VXI," IEEE IMTC '92, May 1992, pp. 265–267.

(List continued on next page.)

Primary Examiner—Heather R. Herndon
Assistant Examiner—Joseph R. Burwell
Attorney, Agent, or Firm—Bernard D. Bogdon; Stephen A. Becker

[57] ABSTRACT

A multimedia system includes a multimedia device control program having a plurality of application program selectable controls for controlling operation of a like plurality of different classes of multimedia devices. Each class has a different set of controllable device functions or attributes. In response to selection of a class by an application program, a unique control panel is created in a user interface for controlling operation of a device. The selected control performs all of the processing actions necessary to control the device in response to user selections on the interface, without involvement of the application program in such actions. The multimedia control program includes a plurality of panel templates from which control panels are created in a control screen. Each panel has a plurality of controllers that can manipulated by a user to control a corresponding function of a multimedia device. The templates provide a consistent interfaces having a common look and feel. The multimedia control program also includes a plurality of class control programs one or more of which are selected by an application program to be attached to a like number of multimedia devices for controlling operation of the devices in response to user selections on the user interface, thereby relieving the application program of performing the necessary control functions.

20 Claims, 7 Drawing Sheets

OTHER PUBLICATIONS

Petzold, "An Introduction to the Media Control Interface", PC Magazine, v. 11, No. 1, Jan. 14, 1992, p. 407 (5).

Petzold, "MCI Command Strings: The Easy Multimedia Interface", PC Magazine, v. 11, No. 2, Jan. 28, 1992, p. 329 (5).

Varney, "Multimedia Development Kit Now Runs Under Motif", Digital News & Review, v. 9, No. 17, Sep. 14, 1992, p. 15 (1).

Arnett, "Workstations-a Software Advantage?", Multimedia Computing & Presentations, v. 4, No. 7, Apr. 30, 1992, p. 1 (3).

Volkman, "The Digital Video Interface for Windows Multimedia", Windows-DOS Developer's Journal, v. 3, No. 9, Sep. 1992, p. 5 (9).

"Microsoft Ships Toolkit for Multimedia Windows", PC Magazine, v. 10, No. 19, Nov. 12, 1991, p. 61 (1).

Seltzer, "05/2 PDK a Boom for Developers", PC Week, v. 9, No. 39, Sep. 28, 1992, p. 1 (2).

Thomsen, "A Software Architecture for VXI Bus Systems", Autotestcon '89 Conference Record, 1989, pp. 327–334.

Southerton, *Programmer's Guide to Presentation Manager*, 1989, Addison-Wesley, pp. 32–36, 75–78, 181, 205–211, 312–313.

Hamilton et al., "The ATTC Laboratory Automation System", National Association of Broadcasters, Apr. 1992.

Pyxis Corp. (Fairfax, Va.) News Release, "New VI Libraries Expand LabView TM Capabilities for Macintosh", Nov. 6, 1992.

Pyxis Corp. (Fairfax, Va.), "Multimedia VIs Application Note", 1992.

Letter from Scott Hamilton, President, Pyxis Corp. (Fairfax, Va.), Sep. 12, 1994.

IBM TDB vol. 34, No. 11, Apr. 1992, p. 29.

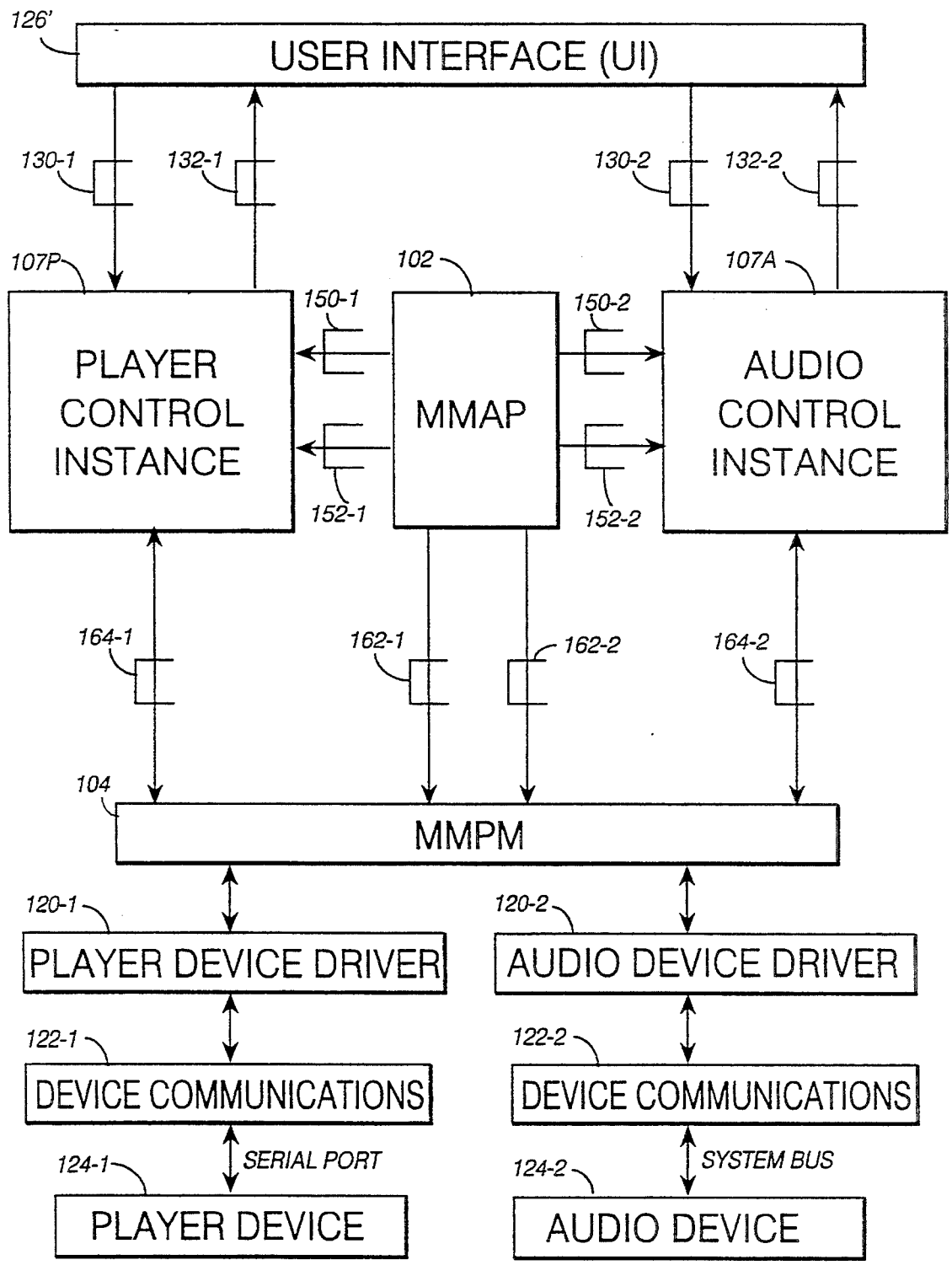

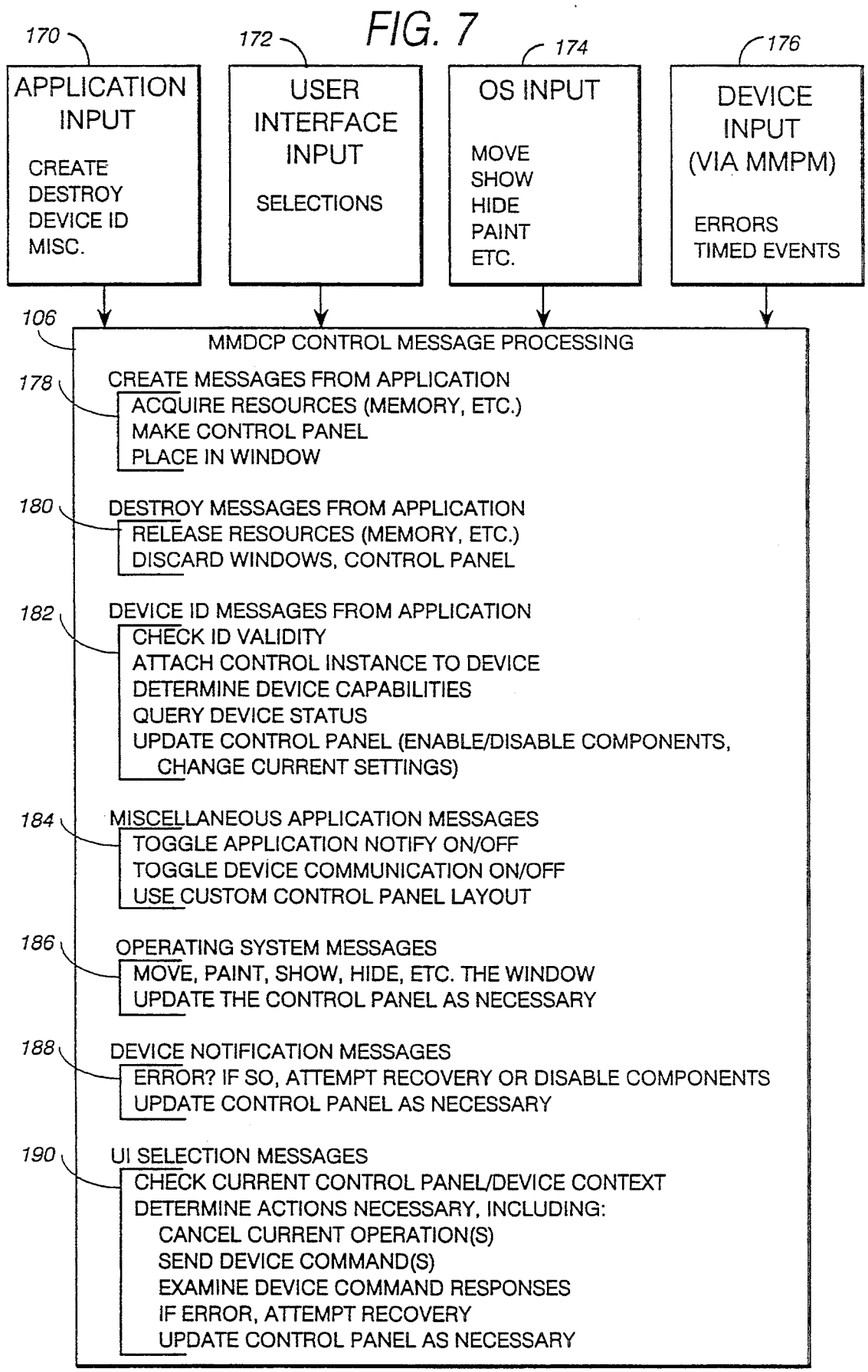

MULTIMEDIA SYSTEM HAVING SOFTWARE MECHANISM PROVIDING STANDARDIZED INTERFACES AND CONTROLS FOR THE OPERATION OF MULTIMEDIA DEVICES

BACKGROUND OF THE INVENTION

This invention relates to the field of data processing, and, more particularly, to an improved multimedia system having a software mechanism that provides standardized interfaces and controls for the operation of multimedia devices.

A multimedia system is designed to present various multimedia materials in various combinations of text, graphics, video, image, animation, sound, etc. Such a system is a combination of hardware and software. The hardware may include a personal computer to which various multimedia devices can be attached. The hardware runs under the control of an operating system and multimedia application programs. Recent commercially available multimedia systems provide multimedia application developers the capability to control the multimedia devices via software. In turn, application developers create programs that allow end users to control a device by manipulating simulated controls, such as buttons, dials, and other elements, on a computer display screen. The application programmers have been required to create their own custom designed device control screens as well as handle all user interactions, device communications, and screen changes. Such custom development has resulted in inconsistent user interfaces, requires knowledge of the device and device control methods, and duplicates effort for multiple applications. These problems reduce useability and increase development expense.

SUMMARY OF THE INVENTION

One of the objects of the invention is to solve the problems noted above by providing a multimedia system with a set of standardized multimedia controls by which a consistent user interface is presented from different application programs.

Another object of the invention is to provide a multimedia control program that interacts with a multimedia application program to control a multimedia device without requiring the application program developer to have an in-depth knowledge of the multimedia device to be controlled.

A further object of the invention is to provide a multimedia control program which provides common functions available for use by multimedia application programs, so as to relieve application programmers of duplicate development effort and to thereby increase multimedia programmer productivity.

Still another object of the invention is to provide a multimedia control program which creates user interfaces comprising display screens having a common look and feel, the screens containing graphic controllers that can be manipulated by users to control multimedia devices.

A still further object of the invention is to provide a multimedia device control program which creates a control panel with minimum involvement of an application program and which thereafter controls operation of the device without intervention of the application program.

Briefly, in accordance with the invention, a multimedia system includes a multimedia device control program having a plurality of application program selectable controls for a like plurality of different classes of multimedia devices. Each class has a different set of controllable device functions or attributes. In response to selection of a control by an application program, a unique control panel is created in a user interface for controlling operation of a device. The selected control performs all of the processing actions necessary to control the device in response to user selections on the interface, without involvement of the application program in such actions.

In accordance with another aspect of the invention, the multimedia application program includes a plurality of predetermined templates defining different control panels which contain user manipulable controllers. The application program sends a message to the control program indicating its selection and the control program creates the desired control screen from the selected template.

DRAWINGS

Other objects and advantages of the invention will be apparent from the following description taken in connection with the accompanying drawings wherein:

FIG. 6 is a simplified diagram similar to FIG. 5 but showing processing for controlling a plurality of different multimedia devices; and FIG. 7 is a block diagram illustrating different inputs into the MMDCP, and the actions responsive to the inputs.

DETAILED DESCRIPTION

Figure 1:
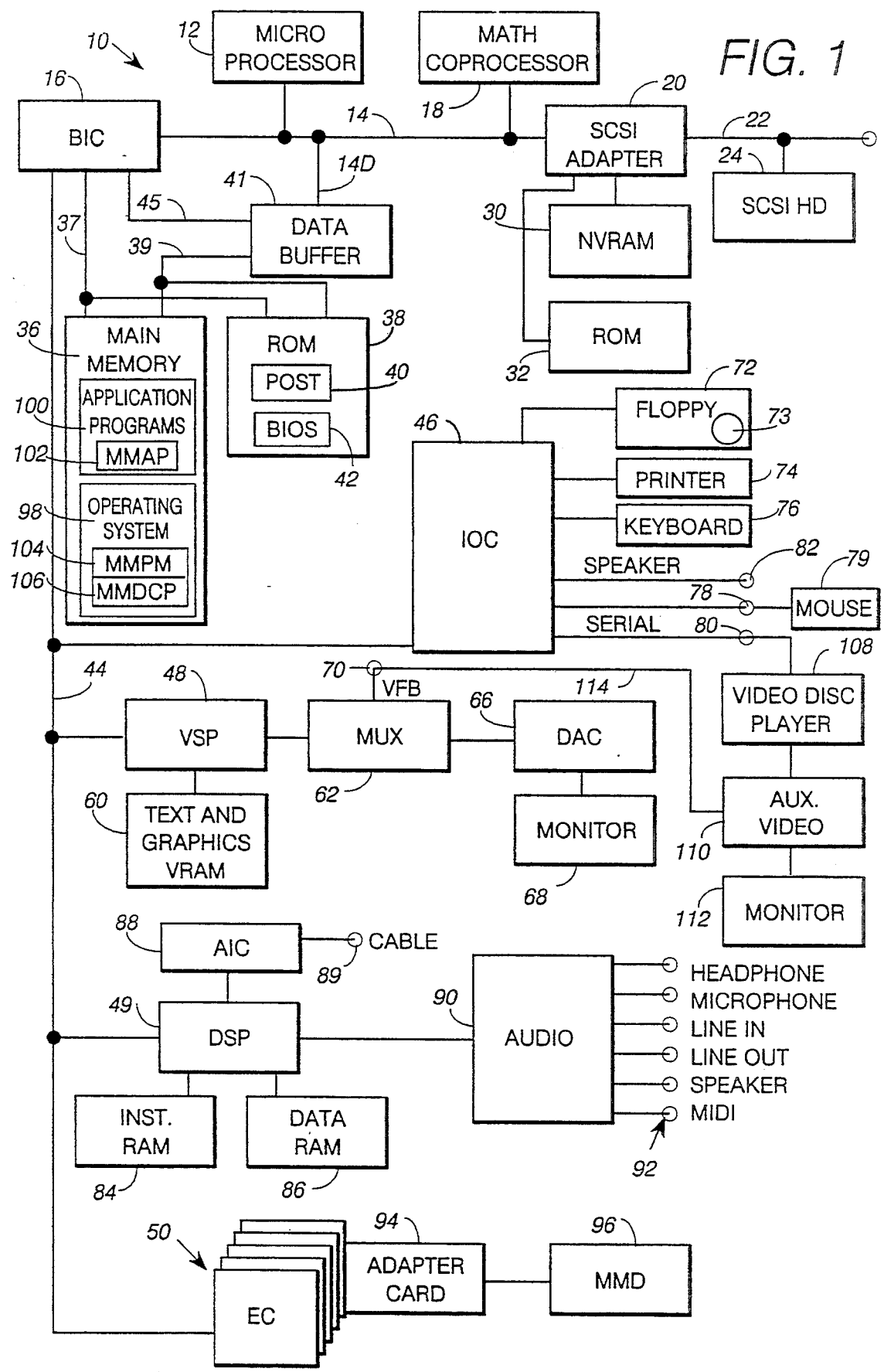
FIG. 1 is a schematic diagram of a multimedia data processing system embodying the invention.

Referring now to the drawings, and first to FIG. 1, there is shown an exemplary multimedia data processing system comprising a personal computer 10 operable under a multitasking operating system such as OS/2 Version 2.0, to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a NVRAM 30 and to a read only memory (ROM) 32.

BIC 16 performs two primary functions, one being that of a memory controller for accessing a main memory 36 and a ROM 38. Main memory 16 is a dynamic random access memory (RAM) that comprises stores data and programs for execution by microprocessor 12 and math coprocessor 18. ROM 38 stores a POST program 40 and a BIOS 42. POST program 40 performs a standard power-on, self-test of the system when computer 10 is started by turning the power on or by a keyboard reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel (MC) architecture. Bus 44 is further connected to an input/output controller (IOC) 46, a video signal processor (VSP) 48, a digital signal processor (DSP) 49, and a plurality of expansion connectors (EC) or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 66 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disc drive 72 designated as the A:-drive, a printer 74, and a keyboard 76. Drive 72 comprises a controller (not shown) and a removable floppy disc or diskette 73. IOC 46 also is connected to a mouse connector 78, a serial port connector 80, and a speaker connector 82, which allow various optional devices to be connected into the system. A mouse 79 is connected to connector 78.

DSP 49 is further connected to an instruction RAM 84, a data RAM 96, an analog interface controller (AIC) 88, and an audio controller (90). RAMS 84 and 86 respectively hold instructions and data used by DSP 49 for processing signals. Audio controller 90 controls various audio inputs and outputs and is connected to a plurality of connectors 92 by which various devices can be connected to the system. Such devices include a headphone, a microphone, a speaker, a musical instrument digitizing interface (MIDI), and devices requiring an audio line-in and line-out functions. Various other multimedia devices (MMD) 96 can be also attached to the system through an EC 50 and adapter card 94.

For purposes of illustrating the invention, system 10 further includes a video disc player 108 having a control line connected to connector 80 of the serial port for receiving start/stop signals through the serial port. Player 108 is also connected to and transmits video signals to an auxiliary video card 110 that has a connection to a monitor 112 and another connection 108 to VFB connector 70.

Memory 36 stores various programs for execution in the system, which programs include application programs 100, including multimedia application programs (MMAP) 102, and an operating system 98 which includes OS/2 multimedia presentation manager (MMPM) 104 and a multimedia device control program (MMDCP) 106. It is to be noted that while FIG. 1 illustrates an exemplary multimedia system, the operating system is general purpose and is designed to run or control data processing systems having configurations that are different from the one shown in FIG. 1. The invention is embodied primarily in MMDCP 106 and its interaction with operating system 100 and the hardware. The combination and interaction of hardware and software is referred to herein as a "software mechanism".

Figure 2:
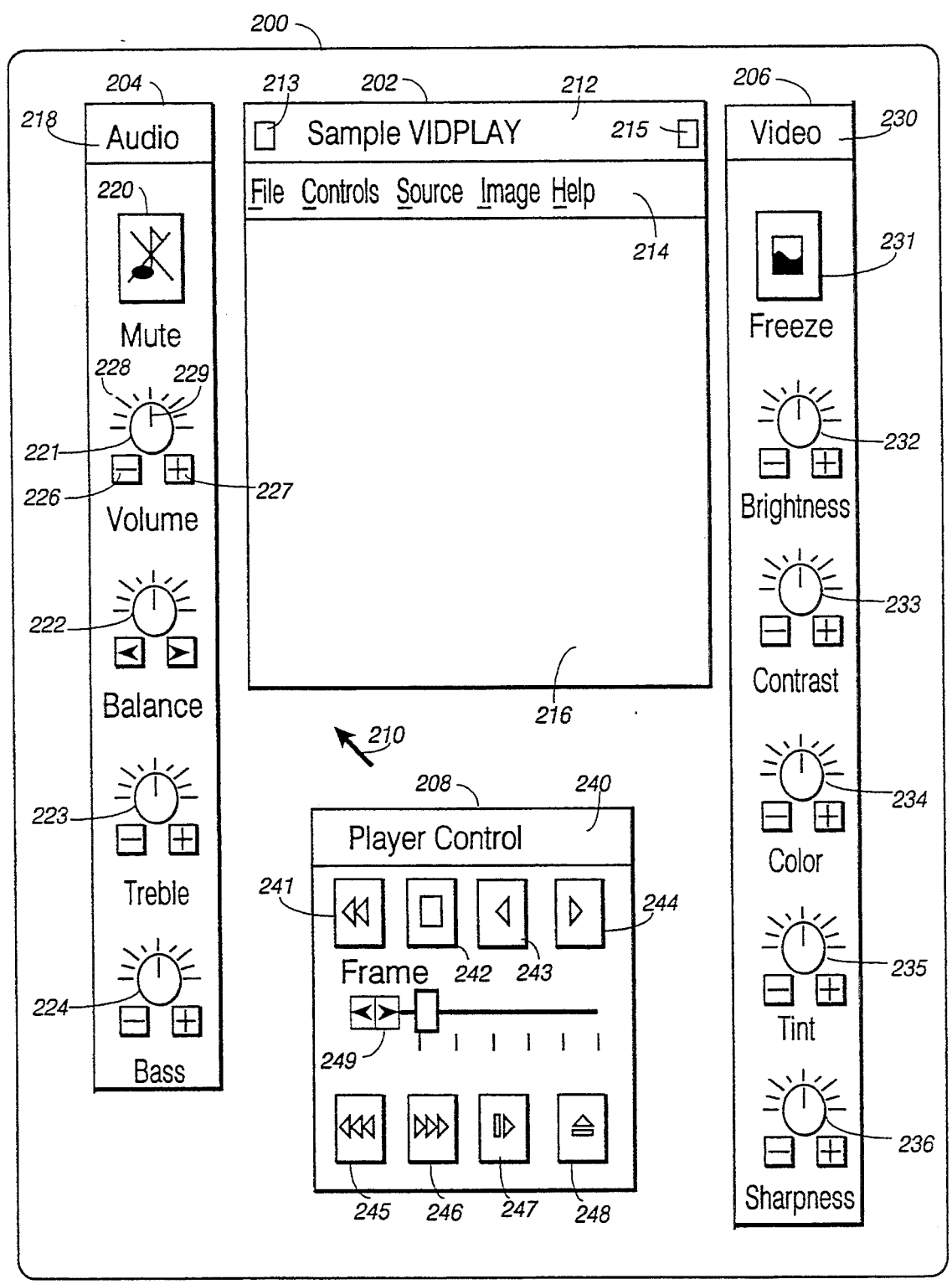
FIG. 2 is a schematic diagram of an exemplary control screen on a display.

FIG. 2 illustrates an exemplary control screen 200 in which a plurality of windows or panels are displayed on a monitor in response to execution of a sample program named "VIDPLAY". This program creates a display of a control screen 200 that includes a video window 202, an audio control panel 204, a video control panel 206, and a player control panel 208. Also presented in the screen is a standard cursor 210 that is manipulated through use of mouse 79. Window 202 contains a title bar 212 bearing the title "Sample VIDPLAY", a window control button 213, a sizing button 215, a menu bar 214, and a video viewing area 216. The window itself is conventional and can be manipulated by means of cursor 210 to change the position and size of the window.

Audio control panel 204 contains a title bar 218 identifying the panel as an "Audio" control panel, and a control area containing various simulated controllers or controls 220–224. Control 220 is a mute button, and controls 221–224 are dials for respectively controlling volume, balance, treble, and bass. With reference to control 221, each dial includes reference marks 228 around the periphery of a circular knob, a movable pointer 229, a decrease button 226, and an increase button 227. Buttons 226 and 227 respectively display graphic symbols "−" and "+" which generally denote the button function. Also included in control 221 is a legend "Volume" signifying the function of the device being controlled. When the cursor 210 is placed on one of buttons and the mouse is clicked, the pointer appears to move until the mouse button is released. Such movement would be accompanied by signals being sent to the physical device whose controls are being simulated to cause the corresponding action to occur. For example, if the cursor is clicked on button 227, pointer 229 rotates clockwise and the actual volume of the audio device would increase.

Video control panel 206 has a title bar 230 displaying the legend "Video", a freeze button 231, and dial controls 232–236 for controlling the brightness, contrast, color, tint, and sharpness, of the video device, e.g., monitor 112 (FIG. 1). Player control panel 208 displays the legend "Player Control" in title bar 240, push buttons 241–248, and a slider control 249. Buttons 241–248 include different symbols symbolic of different player functions controlled thereby. Such buttons provide, for video disc player 108, controls of eject, pause, play, play backward, record, repeat, rewind, scan forward, scan backward, step backward (frame backward), step forward (frame advance), and stop. Slider control 249 displays the current device position in time or frame based units.

Preferably, each button presents a visual differentiation between actuated and non-actuated conditions. This can be accomplished by shadowing the buttons to give appearances of being pushed in or sticking out from the plane of the display. Some of the buttons may also be animated. For example, scan forward and scan backward buttons may have a series of arrows that are successively highlighted to simulate the direction of movement.

It is to be noted that the above discussion of FIG. 2 provides nomenclature facilitating an understanding of the invention as described below. The contents of control screen 200 as shown in FIG. 2 is intended to primarily show what samples of different control panels look like. Quite obviously, in any given system, the type and number of panels is dependent upon what multimedia devices are connected to the system, and what controls are selected to be shown. Further variations in such control panels and how they are created are described hereinafter.

Figure 3:
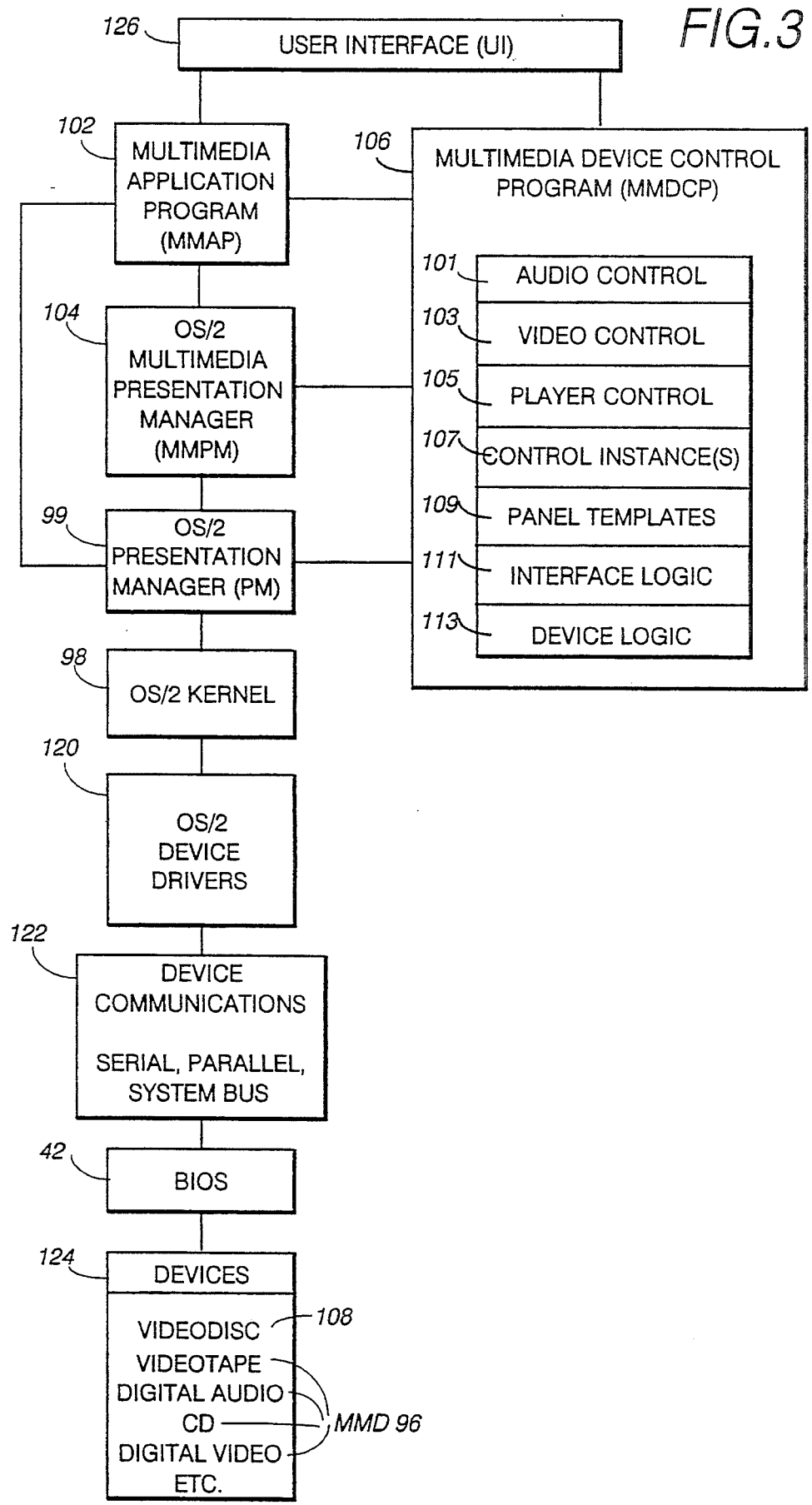
FIG. 3 is a schematic diagram of the major components of the software mechanism included in the system shown in FIG. 1.

FIG. 3 illustrates the layered structure of the software mechanism and the primary programs that are executed concurrently in a multitasking mode, in accordance with the invention. At the top, a user interface 126 communicates with MMAP 102 and MMDCP 106, both of which are above MMPM 104. The latter program interacts with the IBM OS/2 Presentation Manager (PM) program 99 which is above the operating system kernel 98, which sits on top of device drivers 120. PM 99 also communicates with MMAP 102 and MMDCP 106. A device communications program 122 is between drivers 120 and BIOS 42 which is the lowest software layer and provides device specific processing for operating multimedia devices 124. These devices include video disc player 118, and any MMD 96 such as video tape, digital audio, compact disc (CD), and digital video devices.

MMAP 102 is a user oriented application program providing access to services of multimedia devices appropriate to the application, e.g., a video disc browsing program. MMAP 102 interacts with MMDCP 106 for the purpose of providing a user interface for the appropriate device, and with MMPM 104 for opening and closing the device and accessing specific features or performing custom processing not available via the more generic MMDCP 106. MMPM 104 implements a high level, device independent interface to multimedia devices for application use and includes support for device context switching, data streaming, and management of device contention. PM 99 is used for its screen management functions and capability of creating windows on a display screen. OS/2 kernel 98 represents the services provided by the IBM OS/2 operating system. These services generally include functions for process and resource management. Kernel 98 and PM 99 are omitted from later drawing figures for simplicity of illustration. OS/2 device drivers 120 are device specific control programs providing a software interface for controlling individual devices. A device driver at this level generally provides services for a device of a specific type and manufacturer. Device communications 122 indicates a communication mechanism by which a device driver accesses an attached device. Some devices are card type adapters installed in the system for access by the system bus. External devices are generally attached to the computer by a cable plugged into the parallel port or the serial port.

MMDCP 106 comprises an audio control 101, a video control 103, a player control 105, one or more control instances 107, panel templates 109, interface logic 111, and device logic 113. Controls 101, 103, and 105 are separate generic routines or programs for controlling multimedia devices having audio, video, and player attributes. In general, an application program first opens a device, and then sends a message to MMDCP to create a control screen which is done by making an instance or copy of the appropriate control and then attaching the control instance to the device. That is, once the instance has been made, it is necessary to inform it of the identity of the device it will be controlling so that the commands can be sent to the proper device. After attachment, the control instance performs its primary function of controlling the particular device, as described in more detail hereinafter.

Figure 4:
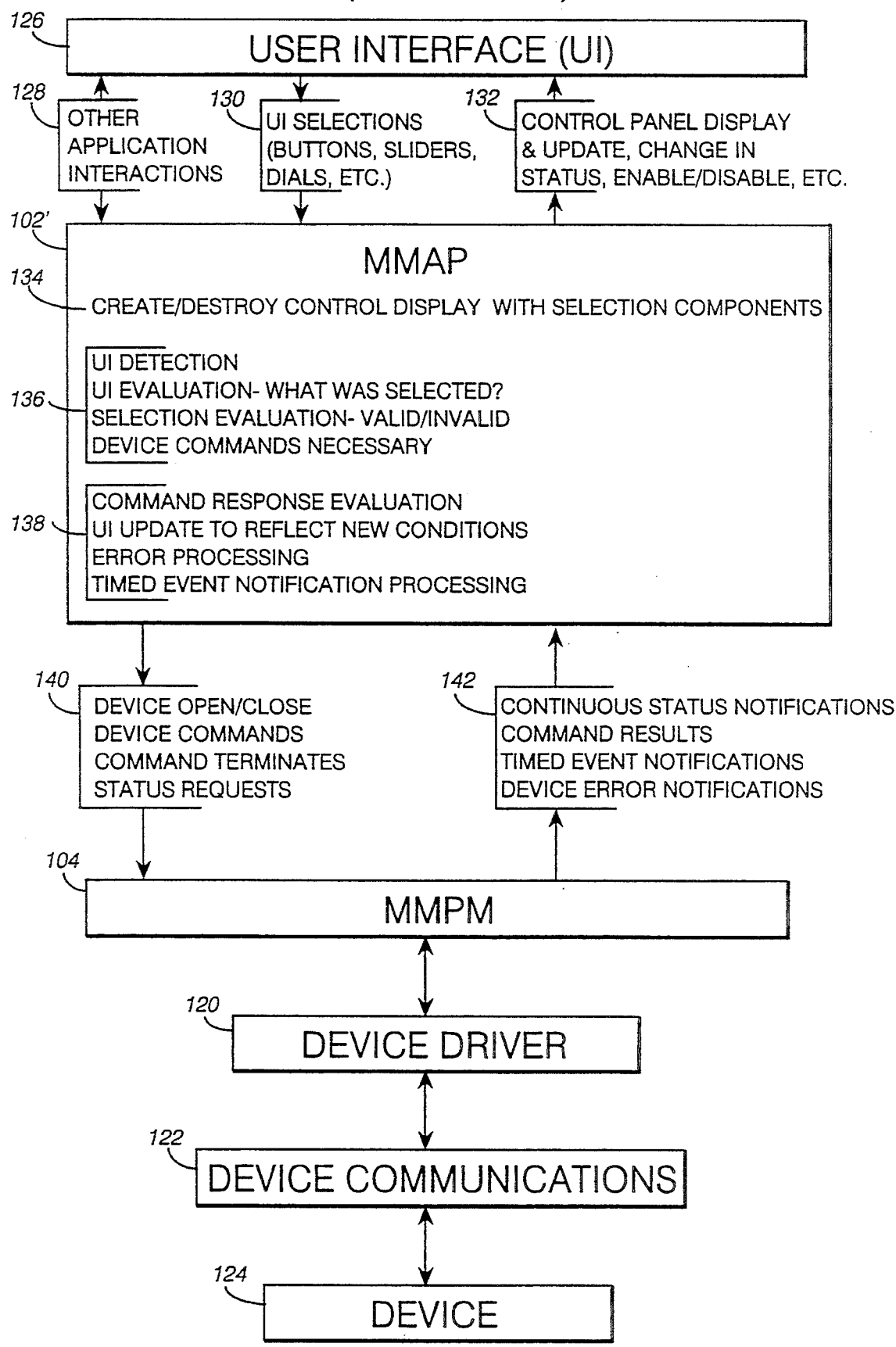
FIG. 4 is a schematic diagram illustrating communications between the major components of a prior art system which the present invention improves.

FIG. 4 illustrates various functions 134, 136, and 138 as performed in the prior art by a typical application program 102' and the interfaces between such program and user interface (UI) 126' and MMPM 104. The illustration is for a system having a single multimedia device 124. The graphics on the screen display together with the means for manipulating the graphics and making selections, form the user interface 126' through which the user interacts with the system to control operation of the multimedia devices. Input messages 130 from the user into the application program 102' include UI selections made by the user actuating the various buttons, sliders, dials, etc. Output communications or messages 132 from the application to the user interface include controlling and updating the panel display, indicating changes in status of the multimedia devices, enabling and disabling buttons or controls which are or are not appropriate for the current device state. For example,if a device is not playing, then the pause button is disabled because its use is not applicable. Other application interactions 128, such as those not pertinent to the control of a MMD, may also occur with the user interface.

Various input/output messages 140 and 142 also communicate between the application and MMPM 104. Application 102' may receive as input messages 142 continuous notifications on the status of the multimedia devices, the results of commands, timed event notifications and device error notifications. The application output messages 140 include device open/close and other commands, command terminates, and status requests.

In response to the application program being run or executed, the program is initially operative to create, by function or step 134, a control screen on a monitor which screen includes one or more controllers. The size, appearance, location, contents, etc. of the control screen are the full responsibility of the application. Once the controllers are displayed, the user can thereafter manipulate the controls and make selections to control operation of a MMD. When the application is being ended, a destroy message 134 destroys the control screen initially created. Functions 136 are performed in response to the application program receiving messages 130 and include detecting UI actions, evaluating the selection as to what action was selected, determining if the selection is valid or invalid, and generating various output messages 140. In response to the application program receiving messages 142, application 102' evaluates responses to commands, updates the UI to reflect new conditions, and processes the notifications of timed events and device errors. The application also sends messages 132 as appropriate in response to such processing. In summary, the messages and interactions explained with reference to FIG. 4 indicate what an application program would have to do in the absence of the invention. It is to be appreciated that application programs normally perform functions in addition to those related to MMD control but inasmuch as the invention is concerned with MMD control, the additional functions have been omitted for simplicity.

Figure 5:
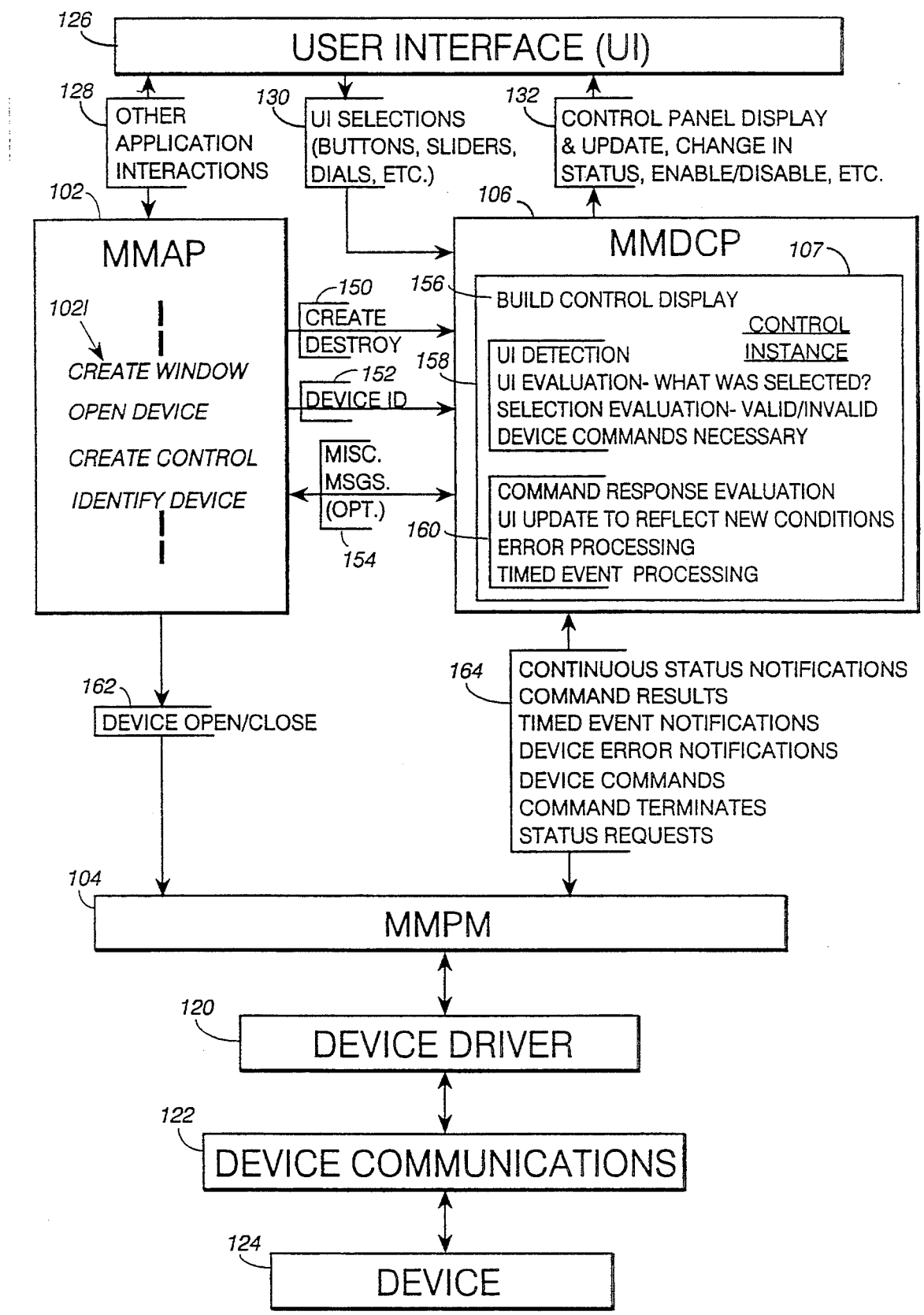
FIG. 5 is a diagram similar to FIG. 4 but showing the improved processing in accordance with the invention for multimedia device control and user interface interaction.

With reference to FIG. 5, in accordance with the invention, MMAP 102 is greatly simplified and reduced relative to the equivalent prior art application program 102' because MMDCP 106 performs most of the functions for generating and receiving communications with the user interface and with MMPM 104. When MMAP 102 is run, a series of instructions 102I are executed. The first instruction is to create a window and this is done by PM 99. The second instruction is to open the device to be controlled and this is done by sending by sending a DEVICE OPEN command 162. The third instruction is to create a control and this is done by sending a CREATE message 150. The fourth instruction IDENTIFY DEVICE sends a DEVICE ID message 152 identifying the particular device to be controlled to MMDCP. In response to messages 150 and 152, MMDCP 106 creates a control instance 107 and attaches it to open device 124. After that, control processing including generating and receiving communications from the UI and the MMPM, is done by control instance 107 thereby relieving the application from doing similar functions and being concerned with knowledge of individual devices. Control instance 107 receives input messages 130 from UI 126, transmits messages 132 to the UI, and communicates with MMPM 104 via two way communications 164. Control instance 107, in response to receiving various inputs, performs the functions described below with reference to FIG. 7. The control screen presents a control interface to the end user, and control instance 107 translates actions and selections on the interface into appropriate media control and system commands.

MMDCP 106 can create three different types of control panels: a video control panel for a device, such as a graphics/video overlay adapter, having video attributes; an audio control panel for a device, such as an amp/mixer device, having audio attributes; and a player control panel for a device, such as a videodisc player, having player attributes. A video control panel typically includes a freeze push button, and circular sliders or dials to control brightness, contrast, saturation, hue, and sharpness. An audio control panel typically includes a mute push button and a series of circular sliders to control volume, balance, treble, and bass. A player control panel typically includes push buttons for combinations of the following player actions: eject, pause, play backward, play forward, play reverse, record, repeat, rewind, scan backward, scan forward, scan reverse, step backward, step forward, and stop. A player control panel might also include a linear slider for position display. It should be obvious that the individual controls depend on the capabilities of the attached multimedia device(s) and the configuration of the player control screen.

FIG. 6 illustrates the manner in which MMDCP 106 controls two multimedia operations for a MMAP that runs two multimedia devices. The devices might be , e.g., a player device 124-1 such as videodisc player 108 connected to the serial port, and an audio device 124-2 connected to one of the expansion connectors 50 and accessible over the system bus. For such a configuration, MMAP 102 needs to send a first DEVICE OPEN message 162-1, a first DEVICE ID message 152-1, and a first CREATE message 150-1 to create a player control instance 107P, and to then send a second DEVICE OPEN message 162-2, a second DEVICE ID message 152-2, and a second CREATE message 150-2 to create an audio control instance 107A. Also, respective player and audio device drivers 120-1 and 120-2 and respective device communications 122-1 and 122-2 have to have been loaded into the system, for establishing communications with the respective multimedia devices. With two devices, the control screen 200 in FIG. 2 could display player control panel 208 and audio control panel 204. Once the control instances are attached, each control instance manages its attached device and configures itself according to the device capabilities. During operation, player control instance 107P receives communications 130-1 for the UI and sends messages 132-1 to the UI, while audio control instance 107A receives messages 130-2 from the UI and sends messages 132-2 to the UI. In the prior art, the application program has to implement and manage the additional functionality to address and handle the functional differences between player and audio devices.

FIG. 7 shows further details of control message processing that is done in response to receiving messages or inputs 170, 172, 174, and 176 from four sources, namely, MMAP 102, UI 126, the operating system, and multimedia device 124 inputs through MMPM 104. In response to receiving a CREATE control screen command, MMDCP is operative to perform the functions 178 and acquire the resources (e.g., memory) for the display, make the desired control panels, and place them on the screen. In response to receiving a DESTROY message from the application, actions 180 release the resources, and discard the window and any control panels on the screen. In response to receipt of a DEVICE ID message from the application, actions 182 comprise checking the validity of the device ID, making a control instance by copying the control and then attaching the control instance to the open device, determining device capabilities, querying the device status, and updating the control panels, e.g., by enabling or disabling components and changing current settings. The attaching is simply notifying the control instance of the ID of device to be controlled. Actions 184 are functions or actions performed in response to miscellaneous messages from the application and include enabling or disabling the sending of notification messages to the application, toggling application notify on/off, toggling device communication on/off, and using custom control panel layout.

Action 186 updates control panels as necessary in response to receiving messages from the operating system. Such messages include hide, show, move, paint, etc. In response to receiving device notification messages, actions 188 include updating the control panel as necessary. If an error has occurred, a recovery attempt is made or the component is disabled. Timed events are events which occur at a device asynchronously with respect to a command issued to the device. For example, if the device is instructed to play for a certain amount of time, the completion of the play command is a timed event which results in a notification being sent to MMDCP 106. At this point, MMDCP 106 stops animating the play button and changes the appearance of the play button to be consistent with a "stop" state. Other timed events might include position notifications and cuepoints. When an input 172 is received, actions 190 are performed to check the current control panel/device context, and determine what actions are necessary. If for example, a device is already playing and the play button is selected, the context indicates no action is necessary and the selection of the play button is ignored. The actions to be done include cancelling current operations, sending device commands, examining device command responses, attempting error recovery, and updating the control panel as necessary. The specific details of the actions described relative to FIG. 7 should be obvious to those skilled in the art and have been omitted to shorten description particularly since the details are not claimed.

A typical sequence of actions that occur can be illustrated by the example of audio control panel 204 and volume controller 221 (FIG. 2). Suppose the user desires a volume increase. To accomplish this using the mouse, the mouse is manipulated to position cursor 210 on button 227 and then clicked and held until the volume increases to the desired level. In response to the mouse being clicked, the following sequence of actions occur. First, presentation manager 99 (FIG. 3) determines which application, the cursor is currently being operated under, which window the cursor is being operated in, and which object in the window has been selected. In this example, the object is the audio controller volume increase button. PM 99 then sends a user interface message 172 (FIG. 7) to the audio control instance which message identifies the object and the control action desired. In response to receiving the message, the audio control instance then performs the functions 190 and determines what actions are necessary. The first is to decide whether to cancel any current operation. If the mute button is on, it would be cancelled to allow audio to be produced by the device. Next, a volume increase device command is sent to the audio device to increase the volume by an increment. At this point the device responds and if the response indicates such action has been done without error, the next action is to update the pointer of the volume dial and this is done by sending a message through PM 99 and user interface which thereupon redraws the volume dial pointer to a new position representing an increment of volume increase. The sequence of actions repeat until the mouse button is released, or until the maximum volume is reached. An optional action (not shown) could be performed before communicating with the device, to give the application program the opportunity to handle the user selection. This is useful in situations where operational customization is done by the application, instead of operating by the control instance. With this option, the application would send a return code indicating it will or will not handle the message.

As indicated above, MMDCP 106 includes a variety of panel templates 109 that are used in making a control panel in 178. MMDCP provides the application programmer with the options of accepting a default panel, a minimal panel, a complete panel, or a custom panel. A complete panel includes all the supported dials, buttons, sliders, etc. for controlling a particular device. A minimal panel includes only those controllers generally considered absolutely necessary. Naturally, the minimal panel occupies less screen area than a complete panel. A custom panel could be defined by the application and use any subset of the components of a complete panel, change relative positions, include other functions, etc. The templates also include vertically oriented panels, such as the audio and video panels shown in FIG. 2, and horizontally oriented panels, for both complete and minimal panels. Additional options include animated buttons (such as movement of arrows on a Play button when a device is playing), and the ability for an application to request that the control only present a user interface but not communicate with the device. This option may be useful if the application desires to control other devices while taking advantage of the user interface standards and processing. The designs of the panels provide a uniform appearance and common look and feel between different applications.

The following application code is written for OS/2 operating system with OS/2 multimedia extensions, and provides an example of the code simplicity of an application program useable with the invention:

```
******** BEGIN EXAMPLE CODE ********
//Open a videodisc device with an alias name and obtain a
//device ID
OpenDevice ((LPSTR)szVdiscDevName, (LPSTR)szVdiscAlias,
&wVdiscDevID);
//Create a window to hold the Player Control Panel on the
//screen
hwndVPCDlg = WinLoadDlg(HWND_DESKTOP,
                hwndClient,
                pVPCDlgProc,
                0,
                ID_DLG_VPC,
                NULL);
//Create the Player Control Panel using MINIMAL
//configuration. "hwndVPC" is the handle uses for any further
//communication with the player control
hwndVPC = WinCreateWindow
(hwndVPCDig,                      //Use the window above
WC_PLAYERCTL,                     //Create Player Control
" ",                              //Misc OS/2 item
WS_VISIBLE | MCS_MINIMAL          //Select panel style
X_MMCTL, Y_MMCTL                  //Starting screen location
200,100                           //Size
hwndVPCDig,                       //Misc OS/2 item
HWND_TOP                          //Misc OS/2 item
ID_VPC_WND,                       //Misc OS/2 item
NULL,                             //Misc OS/2 item
NULL);                            //Misc OS/2 item
//Inform the Player Control to use the videodisc player that
//was opened earlier
    WinSendMsg (hwndVPC, MCM_SETDEVICEALIAS,
    szVdiscAlias,
0)
********END SAMPLE CODE ********
```

In response to successful execution of the above code, a device ID is obtained, a window is created, a player control instance is created, and the device is set. The player control instance will display the control screen including the player control panel, handle all user interface actions, communicate with the videodisc player, etc. No other code in the application program is needed to perform or process selections from the control panel.

As indicated previously, an application program must first create an instance of a control and second, attach the instance to an open device before the control instance can assume responsibility for managing the user interface with the attached device. The first action involves creating a window of the proper window class. There is a window class for each type of supported device to be controlled: audio attributes, video attributes, and player attributes. There are also separate control programs (which may share a function) for each window class. In presentation manager (PM), an application program creates a window using the PM call WinCreateWindow. WinCreateWindow has several parameters including the window class and window style.

The window style of the MMDCP specifies, among other things, the orientation of the control panel (vertical or horizontal) and the degree of desired device control (minimal, complete). The control program uses the style to select one of four layouts for the initial appearance. For example, audio control 204 in FIG. 2 is a vertical, complete control. The result thus promotes a consistent user interface.

The panel templates 109 each specify the type of components and their positions using a dialog template of PM. By way of example, the dialog template corresponding to the layout of audio control panel 204 is:

```
DGLTEMPLATE ID_DLG_AACCOMPLETE_V LOADONCALL MOVEABLE
DISCARDABLE
BEGIN
    DIALOG " ", ID_DLG_AACCOMPLETE_V, 0, 0, 42, 174, NOT
      FS_DLGBORDER | FS_NOBYTEALIGN
      PRESPARAMS PP_FONTNAMESIZE, "8.Helv"
    BEGIN
      PUSHBUTTON " ",    ID_MUTE, 1, 153, 40, 20, WS_TABSTOP
      CTEXT     "Mute", ID_TEXT_MUTE 1,145,40,8
        PRESPARAMS PP_FOREGROUNDCOLORINDEX, SYSCLR_WINDOWTEXT
      PUSHBUTTON "Volume" ID_VOLUME 1,109,40,36,WS_TABSTOP
      PUSHBUTTON "Balance", ID_BALANCE 1,73,40,36, WS_TABSTOP
      PUSHBUTTON "Treble", ID_TREBLE, 1,37,40,36, WS_TABSTOP
      PUSHBUTTON "Bass", ID_BASS 1,1,40,36, WS_TABSTOP
    END
END
```

For the purpose of defining the layout of a control panel, the window class specified in the dialog template is ignored for each of the predefined components such as the mute button or the volume dial. To create the control panel display, the MMDCP uses the information in the template to create each of the desired components. The subset of components present influences the subsequent operation of the MMDCP. For example, a minimal audio control includes only a volume dial and a mute button. A request to update the control panel would query the device only for the applicable information, i.e., the volume and mute status. A complete audio control would cause a query of the device for all of the components, i.e., the mute, volume, bass, and treble status.

The template mechanism also allows the MMAP to specify an alternative layout for a control panel. This is done through an optional miscellaneous application message 184 to USE CUSTOM CONTROL PANEL LAYOUT. In this case, the MMAP provides the desired template to the MMDCP after the panel is created. The custom template supersedes any layout selected at MMDCP creation time. If neither minimal nor complete is specified in the style, then the MMDCP assumes that the MMAP will subsequently provide a layout and no components are created until this is done.

While the invention has been described in connection with a specific operating system, it should be obvious that other operating systems could also be used. Further, it should also be obvious that additional classes of control programs can be added or substituted for the audio, video and player control programs. It should be further apparent to those skilled in the art that many changes can be made in the details and arrangements of steps and parts without departing from the scope of the invention as defined in the appended claims.

What is claimed is:

1. In a multimedia data processing system (MMDPS) comprising a processor, a storage system including a memory for storing at least one multimedia application program (MMAP) and a multitasking operating system for execution by said processor, a monitor for displaying screens of information, and connector means for connecting one or more multimedia devices into said MMDPS, each device having a plurality of controllable functions, each device being in one class of a plurality of different classes of multimedia devices, the improvement comprising:

first means responsive to a DEVICE OPEN command from said application program for opening a multimedia device (hereinafter referred to as open MMD) and for thereafter transmitting signals to said open MMD in response to said first means receiving device commands, said signals being operative to control said controllable functions of said open MMD;

second means comprising a user interface including user manipulable objects on a display screen of said monitor;

and multimedia device control means (MMDCM) layered between said first means and said second means, said MMDCM comprising a plurality of application-program-selectable class-specific controls, each control being for a different one of said classes of multimedia devices;

said MMDCM being responsive to a CREATE message from the application program to select one of said controls (hereinafter referred to as selected control) having the same class as said open MMD;

said selected control comprising third means for creating a control screen on said monitor in said user interface, said control screen having a control panel comprising a plurality of user actuated controllers for controlling different functions of said open MMD;

said user interface being operative to send a user selection message in response to a user manipulating one of said controllers;

and, said MMDCM further comprising processing means operative, in response to receiving said user selection message, to send a device command to said first means for changing a function of said open MMD and to send a message to said user interface to update the one of said controllers manipulated by the user to reflect the changed function of said open MMD.

2. A MMDPS in accordance with claim 1 wherein:
said selected control is a copy of one of said controls (which copy is referred to hereinafter as a control instance);
and said MMDCM is operative to attach said control instance to said open MMD in response to receiving an identification of said MMD.

3. A MMDPS in accordance with claim 2 wherein said control instance is made in response to said CREATE message and said identification is done by a DEVICE ID message from the application program.

4. A MMDPS in accordance with claim 3 wherein:
said MMDCM further comprises a plurality of predefined control panels for each class of said controls, said MMDCM being further operative in response to said CREATE message to select one of said predefined control panels for display in said control screen;

and said processing means is further operative in response to receiving said DEVICE ID message to determine device capabilities and device status, and send messages to said user interface for updating said control panel in accordance with said device capabilities and said device status.

5. A MMDPS in accordance with claim 4 wherein said processing means is operative to selectively enable and disable said controllers in said control screen according to whether or not said MMD has a controllable function corresponding to the control function of each controller.

6. A MMDPS in accordance with claim 4 wherein:
said MMDCM is further operative in response to receiving a second CREATE message to create a second control instance and a second control panel for a second MMD.

7. A MMDPS in accordance with claim 1 wherein said MMDCM further comprises a plurality of predefined control panels for each class of said controls, said MMDCM being further operative in response to said CREATE message to select one of said predefined control panels for display in said control screen.

8. A MMDPS in accordance with claim 7 wherein said predefined control panels for each class include a minimal control panel and a complete control panel, said minimal control panel having a minimum number of controllers for controlling a minimum number of functions, and said complete control panel having a plurality of controllers for controlling a maximum number of functions of each class.

9. A MMDPS in accordance with claim 8 wherein:
said predefined control panels further comprise control panels of horizontal and vertical orientations.

10. A MMDPS in accordance with claim 1 wherein:
said first means is operative to send to said control instance notification messages notifying said control instance of errors occurring in said MMD and timed events occurring in said MMD;
and said processing means is further operative to process said notification messages.

11. In a multimedia data processing system (MMDPS) comprising a processor, a storage system including a memory for storing at least one multimedia application program (MMAP) and a multitasking operating system for execution by said processor, a monitor for displaying screens of information, and connector means for connecting one or more multimedia devices into said MMDPS, each device having a plurality of controllable functions, each device being in one class of a plurality of different classes of multimedia devices, the improvement comprising:

first means responsive to a DEVICE OPEN command from said application program for opening a multimedia device (hereinafter referred to as open MMD) and for thereafter transmitting signals to said open MMD in response to said first means receiving device commands, said signals being operative to control said controllable functions of said open MMD;

second means comprising a user interface including a display screen on said monitor;

and multimedia device control means (MMDCM) layered between said first means and said second means, said MMDCM comprising a plurality of control panel templates for each class of said controls, said templates for each class include a minimal control panel template and a complete control panel template, said minimal control panel template defining a minimum number of controllers for controlling a minimum number of functions, and said complete control panel template defining a plurality of controllers for controlling a maximum number of functions of each class;

said MMDCM being responsive to a CREATE message from the application program to select one of said templates and send a message to said user interface to create a control panel in said control screen in accordance with the definition in the template so selected;

said control panel in said control screen comprising a plurality of user actuated controllers for controlling different functions of said open MMD;

said user interface being operative to send a user selection message to said MMDCM in response to a user manipulating one of said controllers;

and, said MMDCM further comprising processing means operative, in response to receiving said user selection message, to send a device command to said first means for changing a function of said open MMD and to send a message to said user interface to update the one of said controllers manipulated by the user to reflect the changed function of said open MMD.

12. A MMDPS in accordance with claim 11 wherein said minimal control panel templates and said complete control panel templates further define control panels of horizontal and vertical orientations.

13. A MMDPS in accordance with claim 12 wherein said controllers include buttons, dials, and sliders.

14. The method of operating a multimedia data processing system (MMDPS) comprising a processor, a storage system including a memory for storing at least one multimedia application program (MMAP) and a multitasking operating system for execution by said processor, a monitor for displaying screens of information, and connector means for connecting one or more multimedia devices into said MMDPS, each device having a plurality of controllable functions, each device being in one class of a plurality of different classes of multimedia devices, said method comprising:

(a) opening a multimedia device (hereinafter referred to as open MMD);

(b) storing in said storage system a plurality of application-program-selectable class-specific controls, each control being for a different one of said classes of multimedia devices;

(c) creating, in response to a CREATE message from the application program, a control instance from the one of said controls (hereinafter referred to as selected control) having the same class as said open MMD and attaching said control instance to said open MMD;

(d) creating a control screen on said monitor in said user interface, said control screen including a control panel comprising a plurality of user actuated controllers for controlling different functions of said open MMD;

(e) sending a user selection message from said user interface to said control instance in response to a user manipulating one of said controllers;

(f) generating, in response to said control instance receiving said user selection message, at least one device command for changing a function of said open MMD, based upon said user selection message and current operational state of said open MMD;

(g) transmitting signals to said open MMD in response to said device commands, said signals being operative to change one of said controllable functions of said open MMD;

and (h) sending a message to said user interface to update the one of said controllers manipulated by the user, to reflect the changed function of said open MMD.

15. The method according to claim 14 further comprising:

storing in said storage system a plurality of control panel templates for each class of said controls, said templates for each class include a minimal control panel template and a complete control panel template, said minimal control panel template defining a minimum number of controllers for controlling a minimum number of functions, and said complete control panel template defining a plurality of controllers for controlling a maximum number of functions of each class;

and selecting one of said templates;

said step (d) being performed by creating said control panel in said control screen in accordance with the definition in the one template so selected.

16. The method according to claim 15 comprising:

selectively enabling and disabling said controllers in said control screen according to whether or not said MMD has a controllable function corresponding to the control function of each controller.

17. The method according to claim 15 comprising:

determining device capabilities and device status, and sending a message from said control instance to said user interface to update said control panel in accordance with said device capabilities and said device status.

18. The method according to claim 15 comprising:

sending to said control instance notification messages notifying said control instance of errors occurring in said MMD and timed events occurring in said MMD;

and processing said notification messages.

19. The method according to claim 14 further comprising:

storing in said storage system a plurality of control panel templates for each class of said controls, said templates for each class include a minimal control panel template and a complete control panel template, said minimal control panel template defining a minimum number of controllers for controlling a minimum number of functions, and said complete control panel template defining a plurality of controllers for controlling a maximum number of functions of each class;

including in said application program a template defining a custom control panel;

specifying in said CREATE message which template is to be used in step (d)

said step (d) creates a custom control panel in said control screen when said custom control panel template is specified in said CREATE message.

20. The method according to claim 14 comprising:

sending a message to said application program in response to receiving said user selection message in step (e), which message requires a response from said application program indicating whether or not said application program will process said user selection message.

* * * * *